July 17, 1962 V. YEADA 3,044,730
SPIN CASTING REEL WITH POSITIVE AND FRICTION BRAKE MEANS
Filed Dec. 21, 1959 3 Sheets-Sheet 1
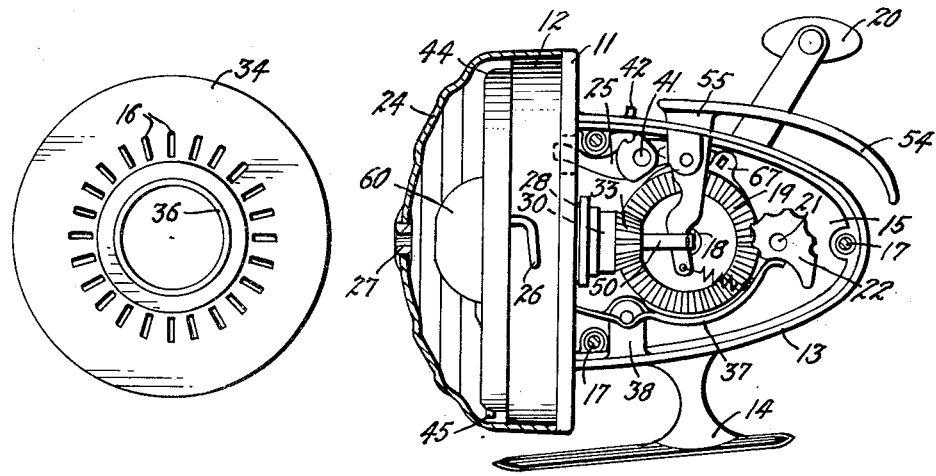
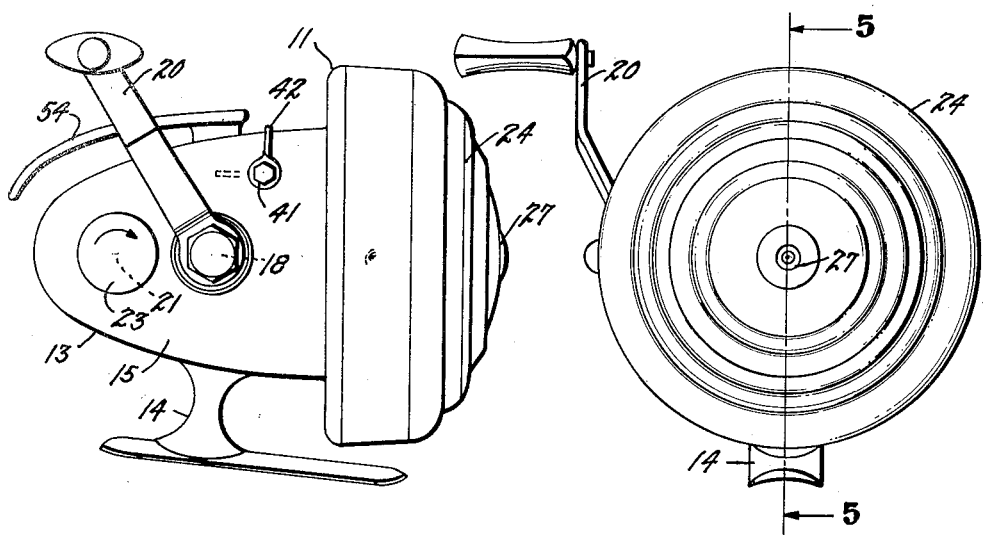
INVENTOR
VICTOR YEADA
BY
ATTORNEY

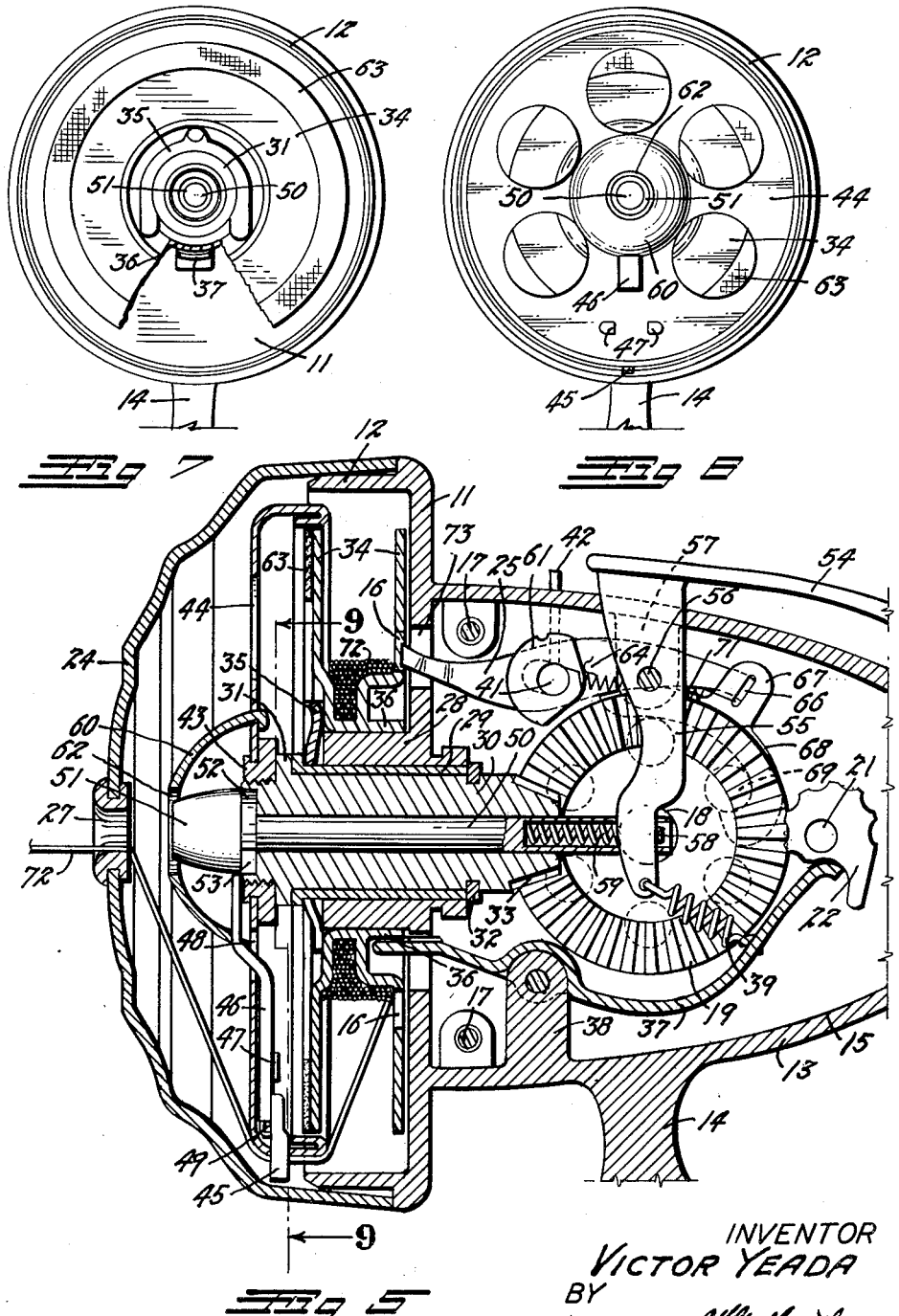

July 17, 1962 V. YEADA 3,044,730
SPIN CASTING REEL WITH POSITIVE AND FRICTION BRAKE MEANS
Filed Dec. 21, 1959 3 Sheets-Sheet 3
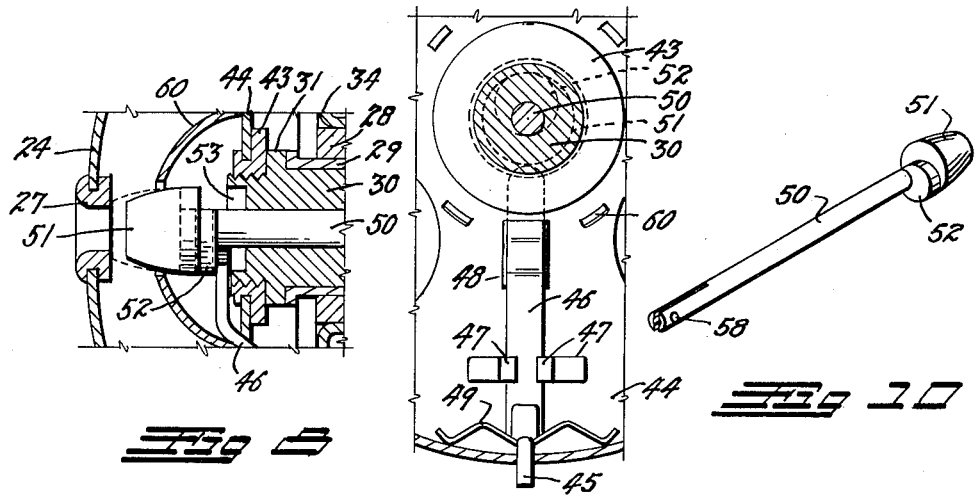
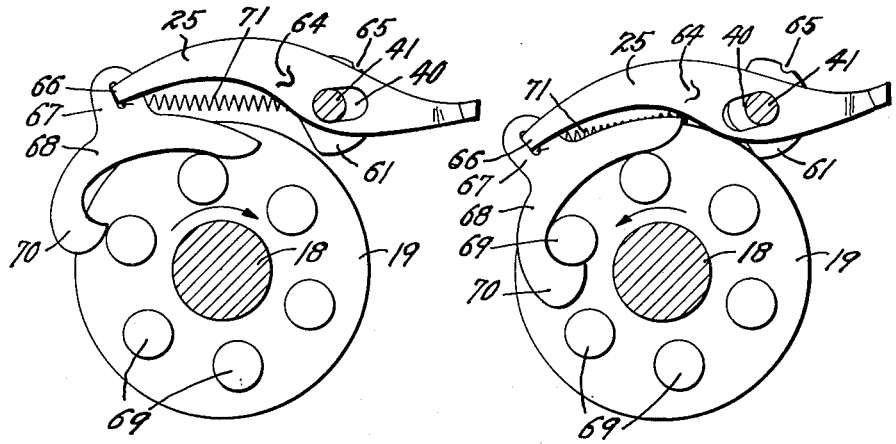
 
INVENTOR.
VICTOR YEADA
BY
ATTORNEY

United States Patent Office 3,044,730
Patented July 17, 1962

3,044,730
SPIN CASTING REEL WITH POSITIVE AND FRICTION BRAKE MEANS
Victor Yeada, Denver, Colo., assignor to Wright & McGill Co., Aurora, Colo., a corporation of Colorado
Filed Dec. 21, 1959, Ser. No. 861,147
4 Claims. (Cl. 242—84.2)

This invention relates to a fishing reel and more particularly to a spinning reel of the type having a crank-rotated flyer for winding the fish line on a line spool as described and illustrated in applicant's co-pending application, Serial No. 725,013, now Patent No. 2,989,266, and has for its principal object the provision of a two-position control device for controlling the retrieving of the line which, when in one position, herein designated as the direct retrieve position, will lock the spool against rotation so that full stress can be placed in the line by rotation of the crank in the retrieving direction, and which, when in the second position, herein designated as the preset stress position, will release the spool when the stress in the line exceeds a predetermined stress so that the fish can take out line by placing sufficient stress thereon regardless of continued crank rotation.

Another object is to construct the retrieve control device that when in the first position, the spool can be instantly unlocked by a simple reverse rotation of the crank to allow the fish to take out line when desired and to provide a highly efficient and accurate brake device for the spool for presetting the line stress in the second position and for resisting rotation when the spool is released in the first position.

A further object is to so construct the retrieving mechanism that when in the second or automatic-play position, it will stop the spool and retrieve the line whenever the pull of the fish diminishes so as to provide an automatic playing action during continuous forward rotation of the crank.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a front view of the improved spin casting reel;

FIG. 2 is a right side elevational view thereof;

FIG. 3 is a left side elevational view thereof showing how the reel would appear with its left side plate removed and with its line hood shown in vertical section;

FIG. 4 is a detail rear side elevational view of a line spool as employed in the improved reel;

FIG. 5 is an enlarged fragmentary vertical, longitudinal sectional view taken on the line 5—5, FIG. 1 illustrating the reel in the retrieving position;

FIG. 6 is a front elevational view on the scale of FIG. 1 showing the reel with its front hood removed;

FIG. 7 is a similar scale front elevational view on the scale of FIG. 1 showing the reel with its front hood and its flyer removed and with its spool partially broken away to expose a backing plate with which the reel is provided;

FIG. 8 is an enlarged fragmentary sectional view on the 5—5, FIG. 1 illustrating the elements in the free spinning position;

FIG. 9 is a similarly enlarged fragmentary sectional view taken on the line 9—9, FIG. 5 showing a line winding tongue employed in the improved reel;

FIG. 10 is a detail perspective view of a plunger shaft used in the reel; and

FIGS. 11 and 12 are diagrammatic views illustrating the action of the retrieve control selector mechanism of the improved reel.

The major portion of the improved spin casting reel is described and illustrated in detail in applicant's copending application, Serial No. 725,013, and will be but briefly described herein. The reel mechanism is mounted in and supported by a unitary die casting shaped to form a circular backing plate 11 having an annular forwardly-projecting, hood-receiving flange 12 on its forward face; a hollow open-sided, D-shaped, housing 13 projecting medially rearward from its rear face; and a reel foot 14, formed integrally with the housing 13, is provided for attaching the reel to a conventional fishing rod.

The open sides of the D-shaped housing 13 are closed by means of a side crank plate 15 and a left side cover plate, not shown. The crank plate 15 and the left side cover plate correspond in shape to the shape of the housing and are clamped to the sides of the housing by means of suitable clamp screws 17.

The left side cover plate is plain. The crank plate, however, is provided with a crank shaft 18 terminating at its inner extremity in a bevel gear 19 and at its outer extremity in a hand crank 20. The crank plate is also provided with a cam shaft 21 terminating at its inner extremity in an eccentric brake cam 22 and at its outer extremity in a knurled finger button 23. As illustrated, the crank plate 15 is positioned on the right side of the housing 13.

A bell-shaped hood 24 is removably fitted over the hood flange 12 and is detachably secured thereon in any desired manner, such as by means of indentations in the hood which engage in bayonet slots 26 in the flange 12. A line grommet 27 is positioned at the exact center of the hood 24.

A tubular bearing sleeve 28 is cast or otherwise formed at the exact center of the backing plate 11 so as to project both forwardly and rearwardly therefrom, and a bearing bushing 29 is press-fitted therein. A trunnion shaft 30 is rotatably mounted in the bearing bushing 29 and prevented from moving longitudinally therein by means of a forward retaining flange 31 formed thereon and a rear snap ring 32 inset therein. Pinion teeth 33 are formed on the rear extremity of the trunnion shaft 30. These teeth are in constant mesh with the teeth of the bevel gear 19 so that rotation of the crank 20 imparts a multiplied rotation to the trunnion shaft 30.

The hub 36 of a line spool 34 is rotatably mounted on the bearing sleeve 28 and is retained in place thereon by means of a removable resilient U-shaped key 35 which is slidably inserted around the forward extremity of the bearing bushing 29 behind the retaining flange 31 so as to resiliently engage the line spool 34. The mid-portion of the forward face of the line spool is depressed as illustrated so as to retain the key 35 in place.

The rear face of the line spool is also depressed to expose a braking surface on the hub 36 against which the forward extremity of a resilient braking lever 37 may be brought to bear for resisting rotation of the line spool. The braking lever 37 is tiltably mounted in a mounting bracket 38 in the housing 13 and is constantly urged at its rear extremity against the brake cam 22 by means of a tension spring 39. Thus, rotation of the finger button 23 flexes the brake lever to apply controlled braking pressure on the spool hub 36 to resist rotation thereof.

The extremity of the trunnion shaft 30 forwardly of the retaining flange 31 is threaded and a hub 43, which is fixedly mounted in a cup-shaped flyer 44, is threaded thereon against the flange 31. The rim of the flyer 44 extends rearwardly about and partially over the line spool 34. A withdrawable line winding pin 45 protrudes radially from the rim of the flyer 44. The pin 45 is mounted on the outer extremity of a radially positioned, longitudinally-slidable cam follower bar 46 which is held in slidable engagement with the rear face of the flyer by means of suitable guide ears 47 and which extends forwardly to the front face of the flyer through a guide opening 48 therein thence inwardly toward the flyer axis. The follower bar 46 is constantly urged radially inward by means of a wire spring 49 resiliently positioned between the outer extremity of the follower bar 46 and the inner surface of the rim of the flyer as shown in FIG. 9.

A plunger shaft 50 extends axially through the trunnion shaft and is longitudinally movable therein. The plunger shaft 50 terminates at its forward extremity in a line-gripping head 51 on the rear of which an eccentric cam 52 is formed. The size and eccentricity of the cam 52 is such that, at one side, it is tangent to the surface of the plunger shaft 50 and at the opposite side it is tangent to and flush with the cylindrical surface of the head. When the plunger shaft 50 is in the retracted position, the eccentric cam 52 is contained within a circular cam socket 53 in the forward extremity of the trunnion shaft 30, as shown in FIG. 5.

The plunger shaft 50 can be forced forwardly when desired by means of a thumb lever 54 which extends rearwardly from the outer extremity of an actuating lever 55 which is pivoted at 56 in a pivot lug 57 formed in the housing 13. The inner extremity of the actuating lever extends through a longitudinally elongated slot in the rear extremity of the plunger shaft 50 and is retained in the slot by means of a suitable transversally-extending cotter key 58. The plunger shaft 50 is resiliently urged forwardly by means of a cushioning compression spring 59 inset in the rear extremity of the plunger shaft.

The tension spring 39 is connected to the extremity of the actuating lever and acts to constantly urge the thumb lever 54 away from the housing and to urge the plunger shaft 50 rearwardly. A protecting dome 60 is concentrically mounted on the flyer about the head 51 of the plunger shaft 50. The dome 60 is provided with an axial opening through which the head may be projected into contact with the line grommet 27 and which completely encloses the head 51 when the reel is in the retrieve or winding cycle so as to prevent entanglement of the line with the head. The dome 60 is provided with a central opening 62 to allow the head 50 to be protruded for the spinning cycle. An annular felt pad 63 is cemented or otherwise secured on the forward face of the line spool 34. The edge of the flexible felt pad projects slightly beyond the periphery of the spool so as to resist the entry of the line between the spool and the rim of the flyer.

To apply this invention to the above described reel the rear face of the spool 34 is provided with an annular series of radially positioned, uniformly spaced latching openings 16 adapted to be engaged by the forward extremity of a latch bolt member 25 arranged to be projected through a latch opening 73 in the backing plate 11. The latch bolt member is provided with a slotted opening 40 which is fitted over a retrieve control selector shaft 41 rotatably mounted in the crank plate 15. A flipper 42 is mounted on the external extremity of the selector shaft 41 and a control cam 61 is mounted on the inner extremity thereof and against inner face of the member 25. The periphery of the control cam 61 contacts a follower lug 64 which is stamped from, and which protrudes inwardly from, the inner face of the latch member 25.

The control cam 61 is so contoured and positioned in relation to the flipper 42 that when the latter is in the vertical, solid line position of FIG. 2 the portion of the least radius of the control cam is against the lug 64, so that the forward extremity of the latch member 25 extends into one of the latching openings 16, as shown in FIG. 5, and when the flipper 42 is in the horizontal, or broken line position of FIG. 2, the portion of greatest radius of the cam 61 will be positioned against the lug 64 to maintain the latch member withdrawn from the latching openings. The selector cam is preferably provided with a click notch 65 to receive the lug 64 and releasably retain the latch bolt member in the withdrawn position.

The rear extremity of the latch member 25 is turned inwardly as shown at 66 to engage in an ear 67 formed on an arcuate ratchet plate 68 positioned between the back of the bevel gear 19 and the crank plate 15. The arcuate ratchet plate 68 is provided with a hooked extremity or pawl 70 which is constantly urged toward an annual series of spaced ratchet bosses 69 cast on the rear of the bevel gear 19 by means of a tension spring 71.

Thus, when the bevel gear is rotated rearwardly, that is counter clock-wise in FIG. 12, one of the bosses 69 will engage in the hooked extremity or pawl 70 on the ratchet plate 68 to rotate the latter rearwardly against the bias of the spring 71. As the ratchet plate rotates rearwardly, it will withdraw the latch member 25 rearwardly until stopped by the limitation of the slotted opening 40 at which time further rearward rotation will be prevented. When the bevel gear 19 is rotated forwardly, the hooked extremity or pawl 70 will ride freely over the bosses 69 with a ratchet-like action as shown in FIG. 11.

Operation

Let us assume that a fishing line such as indicated at 72 is reeled upon the line spool 34 and extends through the grommet 27, and thence through the line guides on the fishing rod to the lure and that the flipper 42 is in the vertical position. To make a cast, the thumb lever 54 is quickly depressed. This moves the plunger shaft forwardly from the path of the cam follower bar allowing the spring wire 49 to snap the bar inwardly to the plunger shaft rearward of the head 51 and rearward of the cam 52 as shown in FIG. 8. This instantly withdraws the winding pin 45 and moves the head 51 forwardly until it grips the line against the grommet 27. The rod is now swung upwardly and forwardly and, at the proper release point in the arc of swing, the thumb lever 54 is released to allow the head 51 to move rearwardly so as to release the line from the grommet 27. This allows the bait or lure to travel forwardly while the line spins about the periphery of the flyer so as to unreel itself without resistance of any kind. To stop or retard the rapidly traveling line, it is only necessary to again depress the thumb lever 54 to force the head 51 forwardly until it restricts or grips the line against the grommet 27.

To retrieve the line, the crank is rotated forwardly. The first rotative movement of the flyer (180° or less) will bring the low point of the eccentric cam 52 into alignment with the cam follower bar 46 so that the plunger rod can snap rearwardly to bring the cam into alignment with the follower rod. Further rotation (180° or less) of the flyer will cause the follower rod to climb the eccentric cam until it reaches the high point thereof in alignment with the surface of the head. This allows the plunger shaft to snap further rearward so that the cam will enter its cam socket 53 and the follower rod will ride on the head 51 with the winding pin projected as shown in FIG. 7. Further rotation of the crank will cause the winding pin to wind the line on the line spool.

To play the fish, the crank is released, and the pull upon the line will rotate the flyer and the bevel gear 19 rearwardly. This rearward movement will withdraw the latch member 25 from the spool and lock the bevel gear against reverse rotation. The tension upon the line acting against the winding pin 42 can now rotate the line spool 34 and play out the line against the frictional resistance of the braking lever 37. Retrieving can be resumed at any time by simply rotating the crank forwardly. The first forward movement will allow the spring 71 to reengage the latch member 25 with the latching openings 16 in the line spool to again lock the latter so that the line can be wound thereon by rotation of the winding pin. The spool can also be released at any time by a slight reverse of the crank to withdraw the latch bolt member.

With the flipper 42 in the lower or horizontal position, the latch bolt member is constantly withdrawn from the spool and rotation of the latter is resisted at all times by the frictional contact of the braking lever 37. The crank can be continuously rotated forwardly in the retrieve direction, as shown in FIG. 11, and the fish can take out line at any time that his pull upon the line exceeds the braking resistance of the braking lever so as to rotate the spool forwardly. This prevents damage to light tackle. For heavy positive retrieve, the flipper is snapped upwardly. For a preset light retrieve, the flipper is snapped downwardly.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. In a spin casting fishing reel of the type having a drive gear rotatable in either a forward or a reverse direction and arranged to rotate a flyer provided with a winding pin positioned to wind a fishing line on a rotatable line spool, means for selectively retaining said spool against rotation comprising:
   (a) an annular series of openings in one side of said spool,
   (b) a longitudinally movable latch member positioned in said reel,
   (c) spring means urging said latch member longitudinally forward into one of said openings,
   (d) ratchet means on said drive gear, and
   (e) pawl means connected with said latch member positioned to be engaged by the ratchet means on said drive gear to withdraw latch member from an opening in said spool when said gear is rotated in a reverse direction.

2. In a spin casting fishing reel of the type having a drive gear rotatable in both a forward and a reverse direction arranged to rotate a flyer provided with a winding pin positioned to wind a fishing line on a rotatable line spool, means for selectively retaining said spool against rotation comprising:
   (a) an annular series of openings in one side of said spool,
   (b) a longitudinally movable latch member positioned in said reel,
   (c) spring means urging said latch member forwardly into one of said openings,
   (d) a ratchet device operable from said drive gear and acting to withdraw said latch member from an opening in said spool when said drive gear is rotated in a reverse direction, and
   (e) manually operated means in contact with said latch member and acting to withdraw the latter from an opening in said spool against the bias of said spring means when desired.

3. A spin casting fishing reel as defined in claim 2; wherein the ratchet device (d) comprises a plurality of protuberances formed on said drive gear; and a pawl member connected with the rear extremity of said latch member and resiliently engaging said protuberances so as to convert reverse movement of said drive gear into a withdrawing movement of said latch member.

4. A spin casting fishing reel comprising:
   (a) a drive gear rotatable in both a forward and reverse direction and provided with ratchet bosses;
   (b) a flyer rotatably connected to said drive gear;
   (c) a line spool positioned adjacent and freely independent of said flyer and provided with latch openings;
   (d) a winding pin arranged to be projected from said flyer to engage and wind a line on said spool when desired;
   (e) a movable latch member positioned to engage one of the latch openings in said spool to positively prevent rotation of the latter, said latch member having an elongated pivot opening;
   (f) a cam shaft rotatably mounted in said reel and passing through said elongated pivot opening to allow both longitudinal and rotative movement of said latch member;
   (g) an eccentric cam fixed on the inner extremity of said cam shaft;
   (h) a cam follower fixed on said latch member;
   (i) a spring urging said follower against said cam to transmit longitudinal withdrawing movement to said latch member in consequence of the eccentricity of said cam;
   (j) a manually-operated flipper on said cam shaft for manually rotating the latter; and
   (k) a pawl member mounted on said latch member and lying against the ratchet bosses on said drive gear and arranged to be engaged by said ratchet bosses so as to withdraw said latch member from an opening in said spool when said gear is rotated in a reverse direction to allow said spool to rotate.

References Cited in the file of this patent
UNITED STATES PATENTS

| | | |
|---|---|---|
| 2,249,433 | Palmer | July 15, 1941 |
| 2,463,728 | Wallin | Mar. 8, 1949 |
| 2,481,638 | Borup | Sept. 13, 1949 |
| 2,587,462 | Goldberg | Feb. 26, 1952 |
| 2,591,052 | Camras | Apr. 1, 1952 |
| 2,828,927 | Yeada | Apr. 1, 1958 |
| 2,834,559 | Nagy | May 13, 1958 |
| 2,904,281 | Jackson | Sept. 15, 1959 |